United States Patent
Chen

(10) Patent No.: US 11,442,327 B2
(45) Date of Patent: Sep. 13, 2022

(54) DISPLAY PANEL

(71) Applicant: TCL China Star Optoelectronics Technology Co., Ltd., Shenzhen (CN)

(72) Inventor: Xingwu Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 246 days.

(21) Appl. No.: 16/644,935

(22) PCT Filed: Jan. 8, 2020

(86) PCT No.: PCT/CN2020/070840
§ 371 (c)(1),
(2) Date: Mar. 5, 2020

(87) PCT Pub. No.: WO2021/128483
PCT Pub. Date: Jul. 1, 2021

(65) Prior Publication Data
US 2021/0405495 A1 Dec. 30, 2021

(30) Foreign Application Priority Data
Dec. 23, 2019 (CN) .......................... 201911335343.2

(51) Int. Cl.
*G02F 1/167* (2019.01)
*G02F 1/16755* (2019.01)
(Continued)

(52) U.S. Cl.
CPC ............ *G02F 1/167* (2013.01); *G02F 1/1676* (2019.01); *G02F 1/1681* (2019.01); *G02F 1/16755* (2019.01)

(58) Field of Classification Search
CPC .. G02F 1/167; G02F 1/167755; G02F 1/1676; G02F 1/1681
See application file for complete search history.

(56) References Cited

U.S. PATENT DOCUMENTS

| 7,319,554 B1* | 1/2008 | Abe ......................... G02F 1/167 |
| | | 359/290 |
| 9,990,073 B2* | 6/2018 | Wang .................. G02F 1/13338 |

(Continued)

FOREIGN PATENT DOCUMENTS

| CN | 1900804 A | 1/2007 |
| CN | 102804039 A | 11/2012 |

(Continued)

*Primary Examiner* — Fred Tzeng
(74) *Attorney, Agent, or Firm* — Kirton McConkie; Evan R. Witt

(57) ABSTRACT

An embodiment of the present application provides a display panel including a first substrate, a second substrate, barrier walls, and an electrophoretic material. The second substrate is disposed opposite to the first substrate, and the second substrate includes a substrate layer, a metal layer, a first protective layer, a nanoparticle layer, and a second protective layer arranged in a stack. The second protective layer is disposed on a side of the second substrate facing the first substrate. The barrier walls are disposed between the first substrate and the second substrate, a plurality of receiving spaces are defined by the barrier walls, the first substrate, and the second substrate, and the electrophoretic material is contained in each of the receiving spaces.

17 Claims, 4 Drawing Sheets

(51) Int. Cl.
*G02F 1/1676* (2019.01)
*G02F 1/1681* (2019.01)

(56) References Cited

U.S. PATENT DOCUMENTS

| | | | | |
|---|---|---|---|---|
| 2006/0209010 A1* | 9/2006 | Ding | ............... | G09G 3/344 |
| | | | | 345/107 |
| 2007/0120812 A1* | 5/2007 | Nagayama | ............... | G02F 1/167 |
| | | | | 345/107 |
| 2008/0112040 A1* | 5/2008 | Suwabe | ............... | G02F 1/167 |
| | | | | 359/296 |
| 2008/0278433 A1* | 11/2008 | Lee | ............... | G09G 3/344 |
| | | | | 345/107 |
| 2009/0066655 A1* | 3/2009 | Kim | ............... | H01H 13/83 |
| | | | | 345/169 |
| 2009/0147348 A1* | 6/2009 | Oshika | ............... | G02F 1/167 |
| | | | | 359/296 |
| 2009/0161200 A1* | 6/2009 | Jang | ............... | G02F 1/167 |
| | | | | 359/296 |
| 2010/0155734 A1* | 6/2010 | Lee | ............... | G02F 1/167 |
| | | | | 257/59 |
| 2011/0026098 A1* | 2/2011 | Komatsu | ............... | G02F 1/167 |
| | | | | 359/296 |
| 2011/0216393 A1 | 9/2011 | Kawahara et al. | | |
| 2011/0222141 A1* | 9/2011 | Komatsu | ............... | G02F 1/167 |
| | | | | 359/296 |
| 2011/0227080 A1* | 9/2011 | Roh | ............... | G02B 26/005 |
| | | | | 257/59 |
| 2011/0228378 A1* | 9/2011 | Hong | ............... | C09J 163/00 |
| | | | | 359/296 |
| 2012/0096436 A1* | 4/2012 | Hinchey | ............... | G06F 8/20 |
| | | | | 717/122 |
| 2012/0113367 A1 | 5/2012 | Kitson et al. | | |
| 2012/0218622 A1* | 8/2012 | Bae | ............... | G02F 1/167 |
| | | | | 359/296 |
| 2012/0280958 A1* | 11/2012 | Lee | ............... | G09G 3/344 |
| | | | | 345/211 |
| 2013/0265735 A1* | 10/2013 | Nakatani | ............... | C09D 11/52 |
| | | | | 361/783 |
| 2015/0160526 A1* | 6/2015 | Li | ............... | G02F 1/13306 |
| | | | | 359/296 |
| 2017/0010516 A1* | 1/2017 | Shiota | ............... | G02F 1/133602 |
| 2017/0017133 A1* | 1/2017 | Hodges | ............... | G02F 1/13452 |
| 2017/0184940 A1* | 6/2017 | Terashima | ............... | G02B 6/0011 |

FOREIGN PATENT DOCUMENTS

CN  106200264 A  12/2016
JP  2007004077 A  1/2007

* cited by examiner

DISPLAY PANEL

FIELD OF INVENTION

The present application relates to the field of display technologies, and in particular, to a display panel.

BACKGROUND OF INVENTION

With rapid development of display technologies, electrophoretic display devices are widely used in display fields such as electronic tags, electronic billboards, and wearable display devices due to their advantages such as light weight and thinness, durability, and low power consumption.

Electrophoretic display devices are generally black and white. In order to achieve color display, methods such as color filters, color dyes, multi-particles, and color microcapsules are usually used.

However, the above methods not only have a complicated driving method, but also cause a reduction in transmittance and resolution of the display devices, thereby affecting display effect of the display devices.

Technical Problem

Current electrophoretic display devices have poor display performance.

SUMMARY OF INVENTION

Technical Solutions

The embodiments of the present application provide a display panel, which can improve the display effect of the display panel.

An embodiment of the present application provides a display panel, including:

a first substrate;

a second substrate disposed opposite to the first substrate, the second substrate including a substrate layer, a metal layer, a first protective layer, a nanoparticle layer, and a second protective layer arranged in a stack, and the second protective layers disposed on a side of the second substrate facing the first substrate;

a plurality of barrier walls disposed between the first substrate and the second substrate, a plurality of receiving spaces defined by the barrier walls, the first substrate, and the second substrate; and an electrophoretic material contained in each of the receiving spaces.

In the display panel provided in the embodiments of the present application, the electrophoretic material includes an electrophoretic liquid and electrophoretic particles, and the electrophoretic particles are black charged particles.

In the display panel provided in the embodiments of the present application, a material of the barrier walls is a hydrophobic material, and the electrophoretic particles are particles having a hydrophobic surface.

In the display panel provided in the embodiments of the present application, a material of the barrier walls is a hydrophilic material, and the electrophoretic particles are particles having a hydrophilic surface.

In the display panel provided in the embodiments of the present application, the electrophoretic particles are configured to move toward the first substrate under an action of an electric field, so that the display panel is in a dark state.

In the display panel provided in the embodiments of the present application, the electrophoretic particles are configured to adsorb on the barrier walls, so that the display panel is in a reflective state.

In the display panel provided in the embodiments of the present application, the display panel further including a plurality of first electrodes and a plurality of second electrodes, wherein the first electrodes are disposed on the first substrate, and the second electrodes are disposed on the second substrate.

In the display panel provided in the embodiments of the present application, each of the first electrodes is a transparent electrode, the first electrodes cover a side of the first substrate facing the second substrate, and are disposed between the barrier walls; and the second electrodes are disposed at a plurality of corners formed by the second substrate and the barrier walls.

In the display panel provided in the embodiments of the present application, the first electrode is configured to apply a voltage to the electrophoretic particles with a polarity opposite to the electrophoretic particles to make the electrophoretic particles move toward the first substrate, so that the display panel is in a dark state; and the second electrode is configured to apply a voltage to the electrophoretic particles with a polarity opposite to the electrophoretic particles to make the electrophoretic particles move toward the corners formed by the second substrate and the barrier walls, so that the display panel returns to a reflective state from the dark state.

In the display panel provided in the embodiments of the present application, the nanoparticle layer includes metal nanoparticles distributed in an array.

In the display panel provided in the embodiments of the present application, the each of the receiving spaces includes a plurality of first accommodation spaces, a plurality of second accommodation spaces, or a plurality of third accommodation spaces, a gap positioned between adjacent metal nanoparticles in each of the first accommodation spaces is a first pitch, a gap positioned between adjacent metal nanoparticles in each of the second accommodation spaces is a second pitch, and a gap positioned between adjacent metal nanoparticles in each of the third accommodation spaces is a third pitch, the first pitch is different from the second pitch, the first pitch is different from the third pitch, and the second pitch is different from the third pitch.

In the display panel provided in the embodiments of the present application, each of the first accommodation spaces is a red region, each of the second accommodation spaces is a green region, and each of the third accommodation spaces is a blue region.

In the display panel provided in the embodiments of the present application, the metal nanoparticles are configured to generate a structural color by plasma resonance with a metal in the metal layer, so that the second substrate reflects visible light.

In the display panel provided in the embodiments of the present application, a material of the metal nanoparticles includes magnesium, aluminum, molybdenum, copper, silver or titanium.

In the display panel provided in the embodiments of the present application, a size of each of the metal nanoparticles ranges from 3 nanometers to 200 nanometers.

In the display panel provided in the embodiments of the present application, a gap between adjacent metal nanoparticles in the nanoparticle layer ranges from 3 nanometers to 400 nanometers.

In the display panel provided in the embodiments of the present application, the electrophoretic material is electronic ink.

In the display panel provided in the embodiments of the present application, a material of the metal layer includes magnesium, aluminum, molybdenum, copper, silver, or titanium.

In the display panel provided in the embodiments of the present application, a material of the first protective layer includes aluminum oxide, silicon nitride, or silicon oxide.

In the display panel provided in the embodiments of the present application, a material of the second protective layer is aluminum oxide, silicon nitride, or silicon oxide.

Beneficial Effect

The display panel provided in the embodiments of the present application includes a first substrate; a second substrate disposed opposite to the first substrate, wherein the second substrate includes a substrate layer, a metal layer, a first protective layer, a nanoparticle layer, and a second protective layer arranged in a stack, and the second protective layer is disposed on a side of the second substrate facing the first substrate; a plurality of barrier walls disposed between the first substrate and the second substrate, wherein a plurality of receiving spaces are defined by the barrier walls, the first substrate, and the second substrate; and an electrophoretic material contained in each of the receiving spaces. Through the present solution, transmittance and resolution of the display panel can be improved, thereby improving display effect of the display panel.

BRIEF DESCRIPTION OF FIGURES

In order to illustrate the technical solutions of the present application or the related art in a clearer manner, the drawings desired for the present application or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

An embodiment of the present application provides a display panel, which will be described in detail below.

Figure 1:
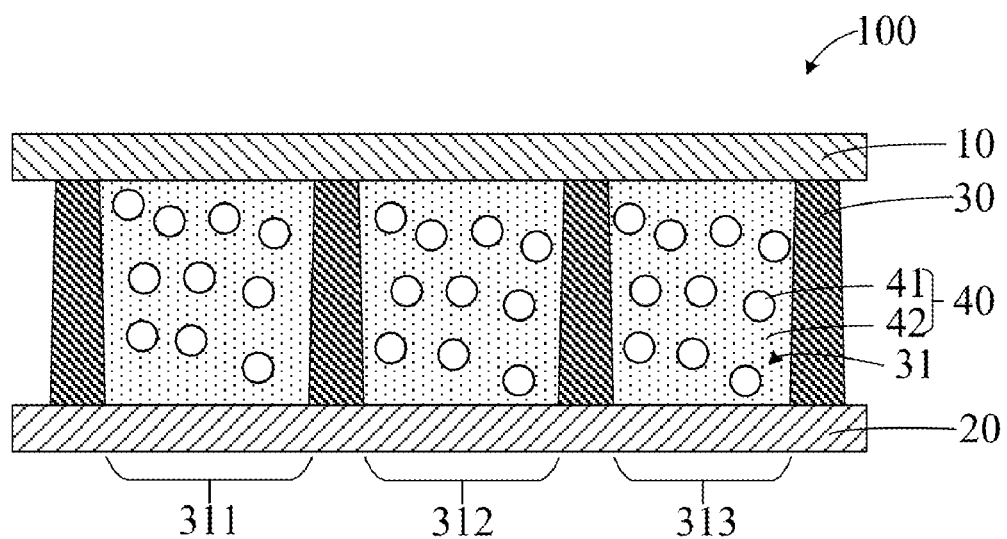
FIG. 1 is a schematic diagram of a first structure of a display panel according to an embodiment of the present application.

Please refer to FIG. 1, which is a schematic diagram of a first structure of a display panel according to an embodiment of the present application. The display panel 100 can include a first substrate 10, a second substrate 20, a plurality of barrier walls 30, and an electrophoretic material 40.

The first substrate 10 can be a flexible display substrate. A material of the first substrate 10 can include an organic flexible material such as polyimide (PI).

Figure 2:
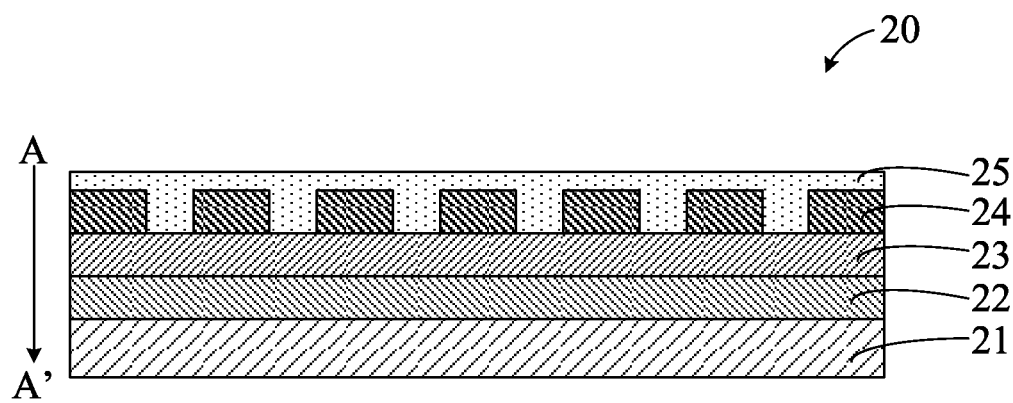
FIG. 2 is a schematic structural diagram of a second substrate of the display panel according to an embodiment of the present application.

The second substrate 20 is disposed opposite to the first substrate 10. In some embodiments, the second substrate 20 can include a substrate layer 21, a metal layer 22, a first protective layer 23, a nanoparticle layer 24, and a second protective layer 25, which are arranged in a stack, as shown in FIG. 2.

It should be noted that, unless otherwise defined, any technical or scientific term used herein shall have the common meaning understood by a person of ordinary skills. Such words as "first" and "second" used in the specification and claims are merely used to differentiate different components rather than to represent any order, number or importance. Thus, the features defined as "first," "second," and "third" may explicitly or implicitly include one or more of the features.

In the description of the present invention, it is to be understood that the terms such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc., the orientation or positional relationship of the indications is based on the orientation or positional relationship shown in the drawings, and is merely for the convenience of the description of the invention and the simplified description, rather than indicating or implying that the device or component referred to has a specific orientation, in a specific orientation. The construction and operation are therefore not to be construed as limiting the invention.

The substrate layer 21 can be a flexible substrate. A material of the substrate layer 21 can include an organic flexible material such as polyimide (PI). Materials of the metal layer 22 and the nanoparticle layer 24 can include metal materials, such as magnesium, aluminum, molybdenum, copper, silver, and titanium. Materials of the first protective layer 23 and the second protective layer 25 can include materials such as aluminum oxide, silicon nitride, and silicon oxide.

Figure 3:
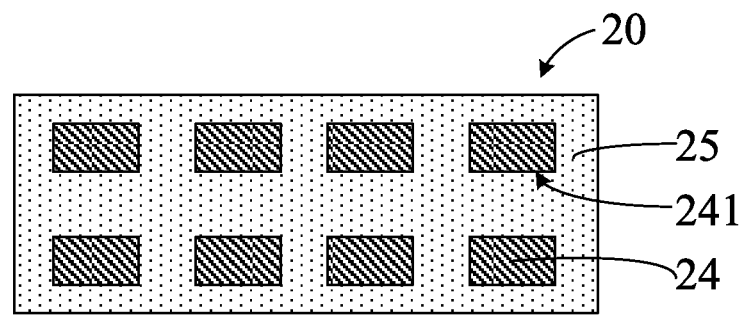
FIG. 3 is a top plane view in a direction A-A' of FIG. 2 according to the embodiment of the present application.

In some embodiments, as shown in FIG. 3, the nanoparticle layer 24 can include a plurality of metal nanoparticles 241 distributed in an array. A size of the metal nanoparticles 241 ranges from 3 nanometers to 200 nanometers, and a gap between adjacent metal nanoparticles 241 ranges from 3 nanometers to 400 nanometers. A shape of the metal nanoparticles 241 can be square, rectangular, circular, or other shapes.

It should be noted that the metal nanoparticles in the nanoparticle layer 24 are configured to generate a structural color by plasma resonance with a metal in the metal layer 22, so that the second substrate 20 reflects visible light.

In some embodiments, the size of the metal nanoparticles 241 in the nanoparticle layer 24 and the gap between adjacent metal nanoparticles 241 can be adjusted accordingly, so that the second substrate 20 can reflect red, green, blue, or other colors of visible light.

The barrier walls 30 can be disposed between the first substrate 10 and the second substrate 20. The barrier walls 30 can be enclosed with the first substrate 10 and the second substrate 20 into a plurality of receiving spaces 31. It should be noted that a material of the barrier walls 30 can be selected according to actual conditions, such as hydrophobic materials or hydrophilic materials.

In some embodiments, the receiving spaces 31 can include a plurality of first accommodation spaces 311, a plurality of second accommodation spaces 312, or a plurality of third accommodation spaces 313. The gap between adjacent metal nanoparticles 241 in each of the first accommodation spaces 311 is a first pitch, the gap between adjacent metal nanoparticles 241 in each of the second accommodation spaces 312 is a second pitch, and the gap between adjacent metal nanoparticles 241 in each of the third accommodation spaces 313 is a third pitch. It can be understood that, in order for the first accommodation spaces 311, the second accommodation spaces 312, and the third accommodation spaces 313 to reflect red, green, or blue light, respectively, the first pitch, the second pitch, and the third pitch are different from each other. That is, the first pitch is different from the second pitch, the first pitch is different from the third pitch, and the second pitch is different from the third pitch. In some embodiments, each of the first accommodation spaces 311 can be a red region, each of the second accommodation spaces 312 can be a green region, and each of the third accommodation spaces 313 can be a blue region.

The electrophoretic material 40 can be stored in the each of the receiving spaces 31. The electrophoretic material 40 can include electrophoretic particles 41 and an electrophoretic liquid 42. The electrophoretic material 40 can be electronic ink. It can be understood that the electrophoretic particles 41 can be moved by an electric field.

It should be noted that the electrophoretic particles 41 can be organic particles, inorganic particles, or colored microcapsule particles. The organic particles can include polymer spheres and similar compound pigment particles. The inorganic particles can include silica, titanium dioxide, or carbon black particles and the like. The colored microcapsules can be particles that package color liquid as in a cod liver oil form. In the embodiment of the present application, the electrophoretic particles 41 are black charged particles.

Figure 4:
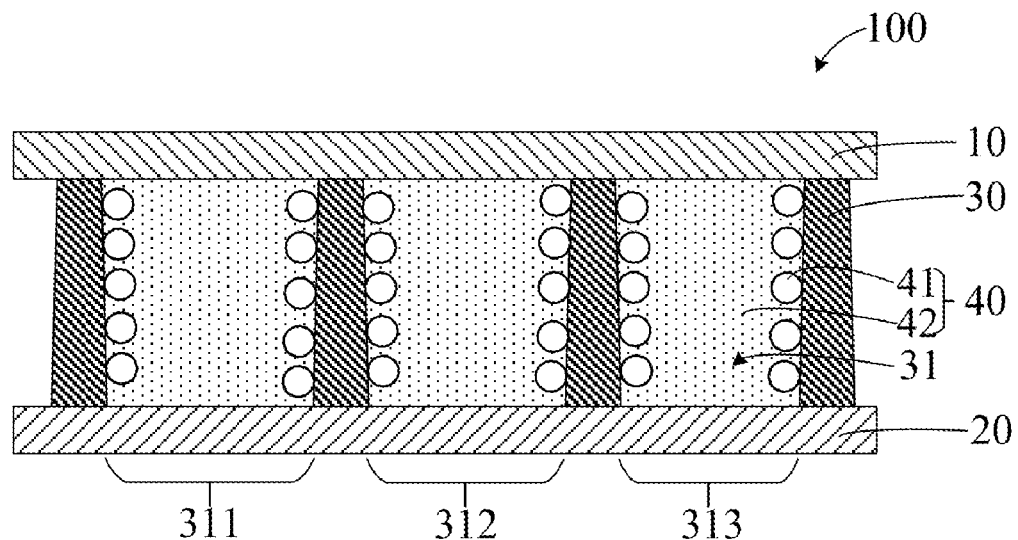
FIG. 4 is a schematic diagram of a second structure of the display panel according to an embodiment of the present application.

In order to allow the electrophoretic particles 41 to be adsorbed onto the barrier walls 30 in the absence of an electric field, so that the display panel 100 is in a reflective state and realizes color display, in some embodiments, the electrophoretic particles 41 and the barrier walls 30 can be set correspondingly. Specifically, when the material of the barrier walls 30 is a hydrophobic material, surfaces of the electrophoretic particles 41 can be subjected to a hydrophobic treatment, so that the electrophoretic particles 41 become particles with hydrophobic surfaces. Or, when the material of the barrier walls 30 is a hydrophilic material, surfaces of the electrophoretic particles 41 can be subjected to a hydrophilic treatment, so that the electrophoretic particles 41 become particles having hydrophilic surfaces. It can be understood that according to the principle of similar phase attraction, when the material of the barrier walls 30 and the surface of the electrophoretic particles 41 have a same property, the electrophoretic particles 41 are adsorbed onto the barrier walls 30 when there is no electric field, as shown in FIG. 4.

Figure 5:
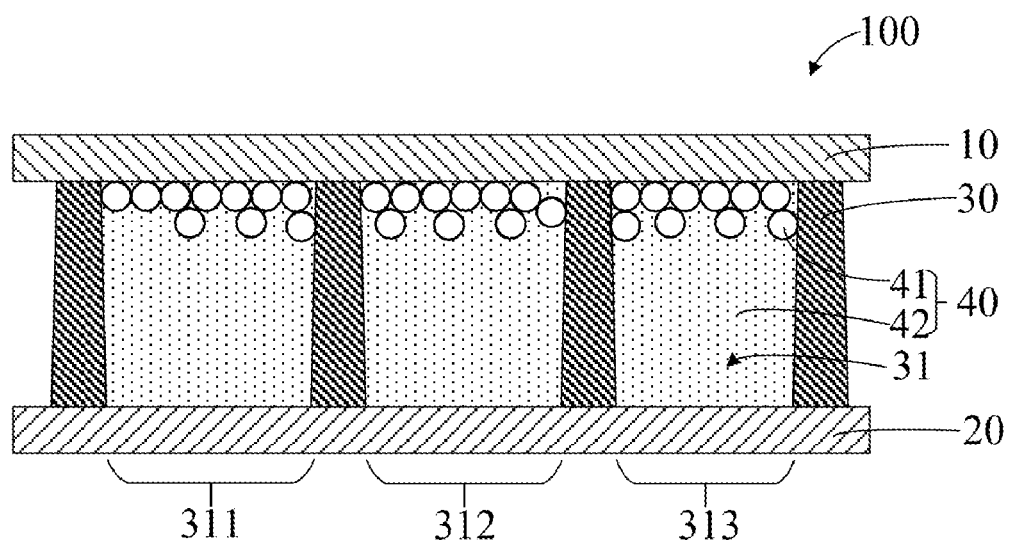
FIG. 5 is a schematic diagram of a third structure of the display panel according to an embodiment of the present application.

It should be noted that when an electric field is present, the electrophoretic particles 41 can move toward the first substrate 10 under the action of the electric field, and finally move to a surface of the first substrate 10, and an incident light can be absorbed by the electrophoretic particles 41, so that the display panel 100 exhibits the dark state, which can be specifically shown in FIG. 5.

The display panel 100 further includes a first electrode 50 and a second electrode 60. The first electrode 50 can be disposed on the first substrate 10. The second electrode 60 can be disposed on the second substrate 20.

It can be understood that when the display panel 100 needs to be returned from a dark state to a reflective state, a voltage applied to the display panel 100 can be stopped, and the electrophoretic particles 41 can move from the surface of the first substrate 10 toward the barrier walls 30 and are finally attracted to the barrier walls 30 according to the principle of similar phase attraction.

However, a speed of the display panel 100 returning from the dark state to the reflective state merely by the principle of similar phase attraction is slow, which may cause a response speed of the display panel 100 to be slow. In some embodiments, in order to speed up the display panel 100 to return from the dark state to the reflective state, the first electrode 50 and the second electrode 60 can be processed accordingly.

Figure 6:
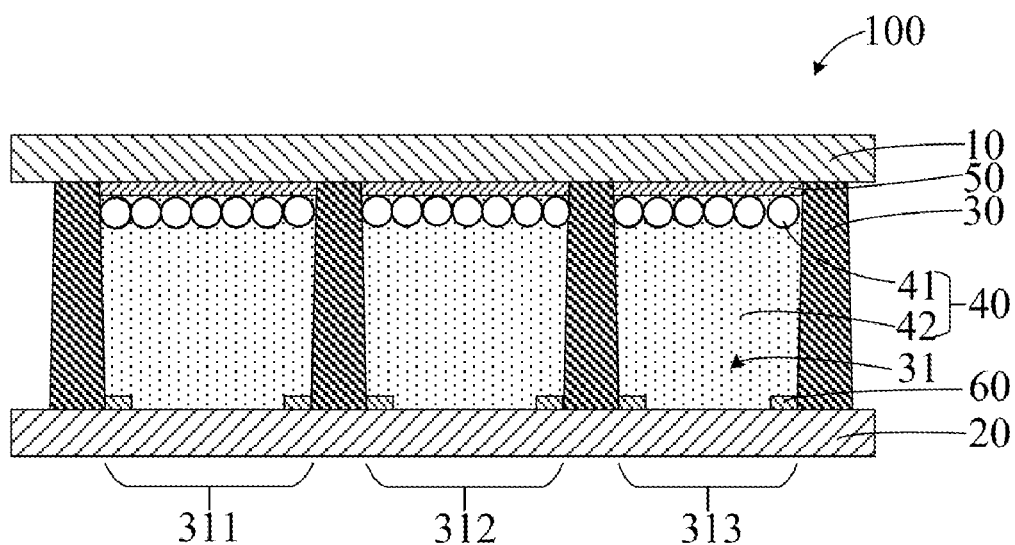
FIG. 6 is a schematic diagram of a fourth structure of the display panel according to an embodiment of the present application.
Figure 7:
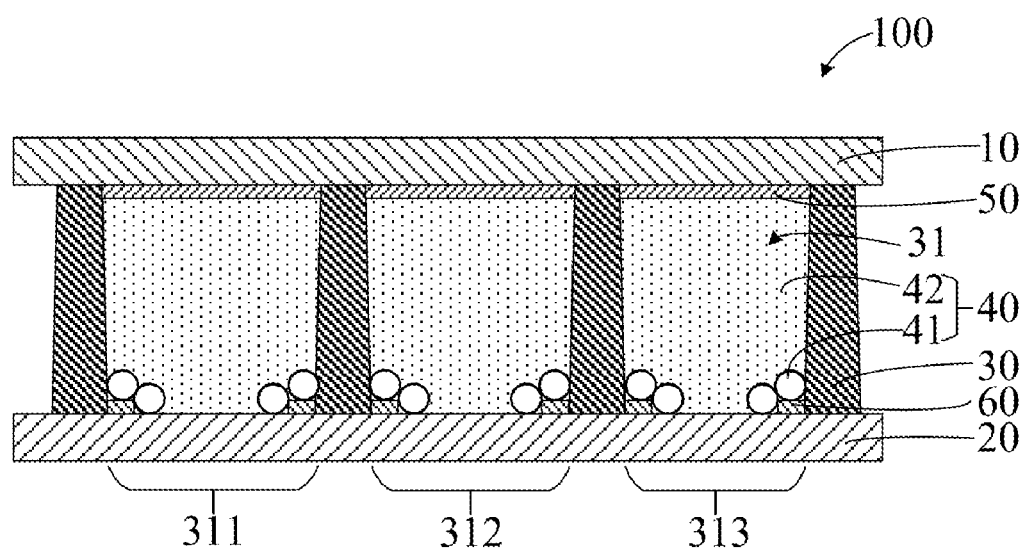
FIG. 7 is a schematic diagram of a fifth structure of the display panel according to an embodiment of the present application.

Specifically, as shown in FIG. 6 or FIG. 7, the first electrode 50 can be configured as a transparent electrode, and the first electrode 50 covers a side of the first substrate 10 facing the second substrate 20. It can be understood that, in order to save manufacturing cost, the first electrode 50 can be divided into a plurality of portions corresponding to only a portion of the first substrate 10 between the barrier walls 30 facing the second substrate 20. That is, the first electrode 50 can be disposed between the barrier walls 30. Specifically, the second electrode 60 can be divided into a plurality of parts, and are disposed at a plurality of corners formed by the second substrate 20 and the barrier walls 30. It should be noted that, when the display panel 100 needs to be in the dark state, a voltage with a polarity opposite to that of the electrophoretic particles 41 can be applied to the first electrode 50, so that the electrophoretic particles 41 move quickly toward the first substrate 10 and are adsorbed onto the first substrate 10, as shown in FIG. 6. The incident light can be absorbed by the electrophoretic particles 41 so that the display panel 100 is in the dark state. When the display panel 100 needs to be returned from the dark state to the reflective state, the voltage applied to the first electrode 50 can be stopped, and a voltage with a polarity opposite to that of the electrophoretic particles 41 can be applied to the second electrode 60, so that the electrophoretic particles 41 quickly move to the corners formed by the second substrate 20 and the barrier walls 30. The incident light can reach the second substrate 20 to make the display panel 100 be in the reflective state, and a color display is realized, as shown in FIG. 7.

From the above mentioned, the display panel 100 provided in the embodiments of the present application can include the first substrate 10, the second substrate 20, the barrier walls 30, and the electrophoretic material 40. The second substrate 20 is disposed opposite to the first substrate 10. The second substrate 20 includes the substrate layer 21, the metal layer 22, the first protective layer 23, the nanoparticle layer 24, and the second protective layer 25. The second protective layer 25 is disposed on the side of the second substrate 20 facing the first substrate 10. The barrier walls 30 are disposed between the first substrate 10 and the second substrate 20. The receiving spaces 31 are defined by the barrier walls 30, the first substrate 10, and the second substrate 20. The electrophoretic material 40 is contained in each of the receiving spaces 31. In the present solution, the metal nanoparticles 241 in the nanoparticle layer 24 of the second substrate 20 are configured to generate the structural color by plasma resonance with the metal in the metal layer 22, so that the incident light can be reflected with corresponding visible light after reaching the second substrate 20. The visible light can be directly emitted from the first substrate 10 without undergoing other processes, such as filtering, thereby reducing light consumption and improving the light utilization rate of the display panel 100. In addition, since the corresponding visible light can be directly reflected by the second substrate 20, color display can be realized without filtering through color resistance or color ink; that is, reducing light blocking and reducing light consumption, thereby improving the transmittance of the display panel 100 and the resolution of the display panel 100, and further improving the display effect of the display panel 100.

The display panel provided in the embodiments of the present application has been described in detail above. The principle and implementation of the present application are explained using specific examples in this document. The description of the above embodiments is only configured to help understand the technical solution of the present application and its core ideas. Those of ordinary skill in the art should understand that any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising:
a first substrate;
a second substrate disposed opposite to the first substrate, wherein the second substrate comprises a substrate layer, a metal layer, a first protective layer, a nanoparticle layer, and a second protective layer arranged in a stack, and the second protective layer is disposed on a side of the second substrate facing the first substrate;
a plurality of barrier walls disposed between the first substrate and the second substrate,
wherein a plurality of receiving spaces are defined by the barrier walls, the first substrate, and the second substrate;
an electrophoretic material contained in each of the receiving spaces;
wherein the nanoparticle layer comprises metal nanoparticles distributed in an array;
wherein the metal nanoparticles are configured to generate a structural color by plasma resonance with a metal in the metal layer, so that the second substrate reflects visible light; and
wherein each of the receiving spaces comprises a plurality of first accommodation spaces, a plurality of second accommodation spaces, or a plurality of third accommodation spaces, a gap positioned between adjacent metal nanoparticles in each of the first accommodation spaces is a first pitch, a gap positioned between adjacent metal nanoparticles in each of the second accommodation spaces is a second pitch, and a gap positioned between adjacent metal nanoparticles in each of the third accommodation spaces is a third pitch, the first pitch is different from the second pitch, the first pitch is different from the third pitch, and the second pitch is different from the third pitch.

2. The display panel according to claim 1, wherein the electrophoretic material comprises an electrophoretic liquid and electrophoretic particles, and the electrophoretic particles are black charged particles.

3. The display panel according to claim 2, wherein a material of the barrier walls is a hydrophobic material, and the electrophoretic particles are particles having a hydrophobic surface.

4. The display panel according to claim 2, wherein a material of the barrier walls is a hydrophilic material, and the electrophoretic particles are particles having a hydrophilic surface.

5. The display panel according to claim 2, wherein the electrophoretic particles are configured to move toward the first substrate under an action of an electric field, so that the display panel is in a dark state.

6. The display panel according to claim 2, wherein the electrophoretic particles are configured to adsorb onto the barrier walls, so that the display panel is in a reflective state.

7. The display panel according to claim 1, further comprising a plurality of first electrodes and a plurality of second electrodes, wherein the first electrodes are disposed on the first substrate, and the second electrodes are disposed on the second substrate.

8. The display panel according to claim 7, wherein each of the first electrodes is a transparent electrode, the first electrodes cover a side of the first substrate facing the second substrate and are disposed between the barrier walls, and the second electrodes are disposed at a plurality of corners formed by the second substrate and the barrier walls.

9. The display panel according to claim 8, wherein the first electrode is configured to apply a voltage opposite to a polarity of the electrophoretic particles to the electrophoretic particles to make the electrophoretic particles move toward the first substrate, so that the display panel is in a dark state; and
the second electrode is configured to apply a voltage opposite to a polarity of the electrophoretic particles to the electrophoretic particles to make the electrophoretic particles move toward the corners formed by the second substrate and the barrier walls, so that the display panel returns to a reflective state from the dark state.

10. The display panel according to claim 1, wherein each of the first accommodation spaces is a red region, each of the second accommodation spaces is a green region, and each of the third accommodation spaces is a blue region.

11. The display panel according to claim 1, wherein a material of the metal nanoparticles comprises magnesium, aluminum, molybdenum, copper, silver, or titanium.

12. The display panel according to claim 1, wherein a size of each of the metal nanoparticles ranges from 3 nanometers to 200 nanometers.

13. The display panel according to claim 1, wherein a gap between adjacent metal nanoparticles in the nanoparticle layer ranges from 3 nanometers to 400 nanometers.

14. The display panel according to claim 1, wherein the electrophoretic material is electronic ink.

15. The display panel according to claim 1, wherein a material of the metal layer comprises magnesium, aluminum, molybdenum, copper, silver, or titanium.

16. The display panel according to claim 1, wherein a material of the first protective layer comprises aluminum oxide, silicon nitride, or silicon oxide.

17. The display panel according to claim 1, wherein a material of the second protective layer is aluminum oxide, silicon nitride, or silicon oxide.

\* \* \* \* \*